Figure 1:
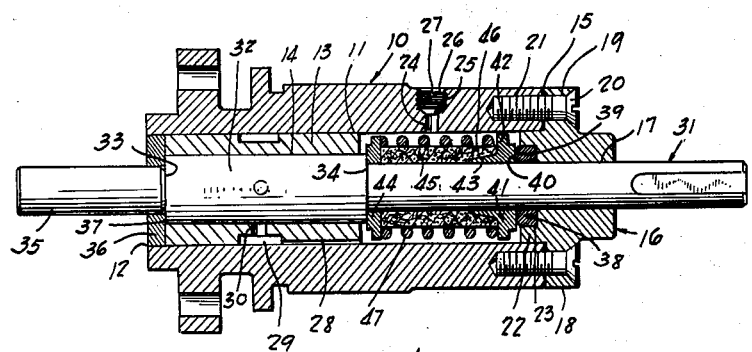

May 21, 1940.   W. V. CZARNECKI, JR., ET AL   2,201,478
DOUBLE ACTING SEALING MEANS FOR RELATIVELY ROTATABLE PARTS

Filed Feb. 28, 1938

INVENTOR.
Walter V. Czarnecki Jr.
& Wesley Czarnecki.
BY Joshua R. H. Potts
ATTORNEY.

Patented May 21, 1940

2,201,478

UNITED STATES PATENT OFFICE 2,201,478

DOUBLE ACTING SEALING MEANS FOR RELATIVELY ROTATABLE PARTS

Walter V. Czarnecki, Jr., Eddington, and Wesley Czarnecki, Cornwells Heights, Pa., assignors to Eddington Metal Specialty Co., Eddington, Pa., a firm composed of Walter Czarnecki, Sr., Mary Czarnecki, Nellie Wojsowski, Wesley Czarnecki, Stanley Czarnecki, Walter V. Czarnecki, Jr., and Casimer Czarnecki Application February 28, 1938, Serial No. 192,988

10 Claims. (Cl. 308—36.2)

This invention relates to sealing means such as are commonly employed for guarding against the escape of fluid and is concerned primarily with the sealing of certain parts of a rotary pump.

At the present time rotary pumps are meeting with widespread use in conjunction with oil burners for the purpose of building up pressure in fuel oil. A rotary pump employed for this purpose ordinarily includes as essential parts a shaft that is mounted on appropriate bearing elements within a pump housing. This shaft carrier the rotor with which are associated the vanes in a well-known manner, such an assembly being clearly illustrated and described in the co-pending application of Walter Czarnecki, Serial No. 168,336, filed October 11, 1937, and entitled "Rotary pump."

Between the bearing elements in the housing and about the shaft there is provided a space constituting a lubricant receiving chamber, and one of the problems which has ever been present in this art is the guarding against the escape of the fuel oil along this shaft, which would be effective to force the lubricant out of its chamber with the obvious harmful effects resulting therefrom.

Up to the present time there have been proposed various types of sealing means for this purpose, but the known sealing means have not been entirely satisfactory in that in the first instance they have not provided the effective seal required. Another undesirable condition attending the use of certain now known sealing means is that they create too great an amount of friction with the shaft which interferes with and resists rotative movement.

Also when the sealing means for any cause has ceased to function properly considerable difficulty and annoyance has arisen in connection with servicing the pumps. It has generally been impractical to make the necessary repairs at the installation, thus requiring a complete dismantling and return to the manufacturer.

With the foregoing conditions in mind this invention has in view, as its foremost objective, the provision of a novel sealing means which is designed to overcome the above-noted unsatisfactory conditions. In attaining this broad objective the invention has in mind the provision of a sealing means of the so-called double acting type, thus insuring of proper sealing effects at all times.

More in detail the invention contemplates an arrangement wherein the double acting sealing means provides a seal between one of the bearing elements and that part of the pump housing which encases the rotor, thus preventing fluid fuel within the pump housing about the rotor escaping along the shaft. Also a seal is provided between the shaft and the other bearing element to prevent the escape of lubricant from the lubricant chamber, or any fuel oil which may have escaped thereinto along the shaft.

The invention has in view, as a further detailed objective, the provision of a sealing arrangement of the character above noted which involves the use of a resilient and elastic packing material that is disposed about the shaft, and which, in addition to performing its usual packing functions, serves to exert an expanding force that assists in attaining and maintaining the seals at the bearing elements in the manner above set forth.

Another more detailed object of the invention is the provision of spring means which is intended to supplement the expanding action of the packing material above noted. With this arrangement proper expanding action at all times is assured. Thus, if either the spring means or the packing material should cease to perform its function, the expanding action is provided by the other, thereby rendering servicing of the pump a less likely need.

In this connection a further detailed object of the invention arises in providing a sealing means that is easily and readily dissembled from the pump housing so that the pump may be serviced at the place of installation.

Yet another object of the invention is to provide a sealing means of the character above noted which is assembled with the shaft to create a minimum amount of frictional resistance to rotation of the shaft.

Particular objects and advantages of the invention are associated with providing the packing material in proper relationship to the remainder of the mechanical parts of the sealing means. These will in part become apparent and in part be hereinafter stated, as the description of the invention proceeds.

The invention, therefore, comprises a sealing means that is designed for assembly with a rotary pump, and which includes means for creating a seal between a bearing element in a pump housing and that portion of the pump housing which contains the pump rotor and associated vanes. A seal between the second bearing element and the pump housing which closes one end of a lubricant chamber is also provided. Both of these seals are created under the influence of certain relatively expanding parts, and this expanding action is obtained both by a resilient and elastic packing material and a spring that is associated therewith.

Figure 2:
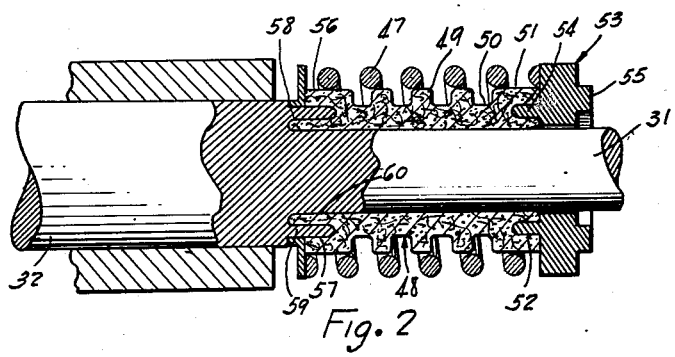
Figure 3:
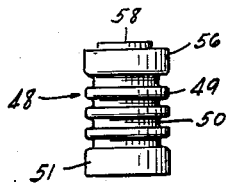
Figure 5:
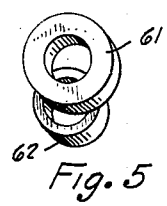
Figure 4:
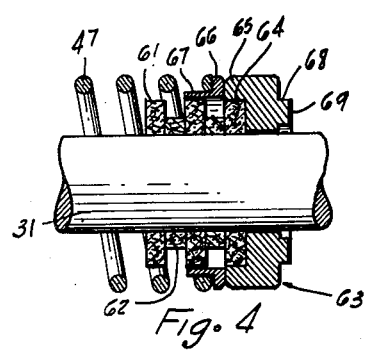

For a full and more complete understanding of the invention reference may be had to the following description and accompanying drawing, wherein Figure 1 is a section through a portion of a pump housing that has a sealing means assembled therewith in accordance with the precepts of this invention, Figure 2 is a view somewhat similar to Figure 1, with the pump housing omitted, bringing out a modified form, Figure 3 is a side elevational showing of the packing member employed in the modification shown in Figure 2, Figure 4 is a detailed showing somewhat similar to Figure 2, but with additional parts removed, of still another modification, and Figure 5 is a detailed perspective of a pair of packing elements employed in the form of the invention shown in Figure 4.

While the present invention is illustrated and described as employed in conjunction with a rotary pump it is to be clearly understood that the use of the invention is not to be limited in this respect. Obviously it is susceptible of use in any mechanical assembly where it is desirable to create seals at spaced points under conditions comparable to those herein set forth.

Referring now to the drawing, a portion of a pump housing is identified as 10. This housing is formed with a bore 11 which opens at one end into the chamber about a rotor (not illustrated), this end being designated 12.

Adjacent the end 12 but spaced slightly inwardly with respect thereto is a bearing element in the form of a sleeve 13. This bearing element is tightly received within the bore 11 as by a pressed fit. This bearing sleeve 13 is formed with a bore 14.

The pump housing 10 has an open end at 15 as defined by the bore 11, and this open end is closed by an end closure referred to in its entirety as 16. The end closure 16 is formed with a bore 17 that is co-axial with the bore 14 of the bearing sleeve 13. It is notable that the bore 17 of the end closure 16 also constitutes a bearing element, as will be later set forth.

The end closure 16 is formed with a flange 18 that engages the end 15 of the pump housing 10. The flange 18 is formed with a plurality of openings 19 through which extend headed screw bolts 20 that are received in threaded sockets 21 in the pump housing 10, thus securely anchoring the end closure 16 in position.

Extending within the bore 11 of the pump housing 10 is a cup shaped structure defined by a flange 22. The outer wall of the flange 22 snugly engages the bore 11 as by a sliding fit, while the inner cylindrical wall of this flange 22 has a larger diameter than the bore 17, for a purpose to be hereinafter pointed out. This inner cylindrical wall is designated 23.

An opening 24 extends through the pump housing 10 and is enlarged, as shown at 25, and this enlarged portion 25 is threaded. This opening 24 constitutes a means for supplying lubricant to the space defined by the bore 11, and a closure therefor is shown in the form of a screw plug 26 that may be provided with a tool engaging socket 27.

A groove 28 is formed in the outer wall of the bearing sleeve 13, and this groove communicates at one end with the space defined by the bore 11, and at the other end with an enlarged circular recess 29. A passageway 30 extends from the recess 29 through the wall of the bearing sleeve 13 to the bore 14.

A shaft designated 31 is formed with an enlarged portion 32 that is defined by shoulders 33 and 34, and this enlarged portion 32 is rotatably received within the bore 14 of the bearing sleeve 13. The shaft 31 is rotatably received in the bore 17 of the end closure 16. The shaft 31 is also shown as having an extension 35 that extends beyond the enlarged portion 32, and this extension 35 is adapted to have a rotor (not illustrated) keyed thereto in a manner clearly illustrated and described in the co-pending application of Czarnecki above identified.

A sealing ring 36 is tightly fitted in the bore 11 of the pump housing 10 at the end 12, and this sealing ring has a surface at 37 that engages the shoulder 33 of the enlarged portion 32 of the shaft 31 with a ground fit to provide a fluid-tight seal. As illustrated, this ring 36 is fitted about the portion 35 of the shaft 31 so that the latter rotates therewithin.

The wall 23 of the flange 22 together with the shaft 31 defines a recess in which is fitted a ring 38. The ring 38 engages the wall 23 with a pressed fit, and the shaft 31 rotates within the opening of the ring 38. This ring 38 is formed with a surface 39 that engages with a corresponding surface 40 formed on a packing gland 41 with a ground fit.

The packing gland 41 is tightly fitted about the shaft 31 and rotates therewith. This packing gland 41 is formed with a ring-like flange 42 and with a conically shaped axially extending flange 43, for a purpose to be hereinafter pointed out.

An end ring 44 is snugly fitted about the shaft 31 to rotate therewith, and is in engagement with the shoulder 34. Interposed between this ring 44 and the flange 42 of the packing gland 41 is a packing member 45 that may be made from an appropriate resilient and elastic material providing a required expanding action, and which material should not be susceptible to any deleterious effects from oil. The invention has particularly in mind the use of a new well-known rubber packing composition that is impervious to oil and acid.

In the form of the invention shown in Figure 1 the packing member 45 takes the form of the cylindrical sleeve illustrated, and which sleeve is formed at one end with a conically shaped recess 46 in which is received the flange 43 of the packing gland 41.

It is evident that the expanding action of the packing sleeve 45 serves to urge the surface 40 of the packing gland 41 against the corresponding surface 39 of the ring 38, the engagement being a ground fit, to provide a fluid-tight seal at this point. The same expanding action, through the engagement of the ring 44 with the shoulder 34, urges the ground surface of the shoulder 33 against the ground surface 37 of the ring 36 to provide a fluid-tight seal at that point.

The expanding action of the packing sleeve 45 is preferably supplemented by a coil spring shown at 47; this spring being interposed between the ring 44 and flange 42, and exteriorly of the packing sleeve 45.

As occasion demands lubricant may be supplied to the lubricant chamber defined by the bore 11 by removing the plug 26 and forcing the lubricant through the opening 24. This lubricant will pass through the groove 28, circular recess 29 and passageway 30 to the bore 14 of the bearing sleeve 13, to effectively lubricate the relatively movable parts 32 and 13. Any possibility of escape of the lubricant along the shaft 31 is precluded by the ground fit at 39—40.

At the same time the ground fit at 33—37 insures that none of the fluid fuel under pressure will escape along the large part 32 of the shaft 31 and enter the lubricant chamber. Thus the lubricant will not be forced out of its chamber, which is a highly undesirable factor.

It is evident from the foregoing that in the event the packing sleeve 45 should fail to perform its expanding function the spring 47 will serve to urge the packing gland 41 against the ring 38 at one end, and the shoulder 33 of the enlarged portion 32 against the ring 36 at the other end, and the converse of this is also true. However, under normal operating conditions both the packing sleeve 45 and spring 47 will perform this expanding action to insure of proper functioning of the seals.

Under certain conditions it will be desirable to provide a modified form of packing sleeve to insure of greater elasticity and resiliency therein. Accordingly reference is made to the form of the invention shown in Figures 2 and 3, in which the packing sleeve 45 is replaced by a packing sleeve 48 of the same material. This sleeve 48 has an outer corrugated surface defined by ribs 49 and grooves 50.

At one end the sleeve 48 is provided with an enlarged portion 51, the end surface of which is formed with a circular groove 52. When this form of the invention is used the packing gland 41 will be replaced by the packing gland shown at 53. This packing gland 53 is formed with a flange 54 that is spaced from the shaft 31, and which is received within the groove 52. The packing gland 53 will be formed with a ground surface 55 that is comparable to the ground surface at 40 of the packing gland 41, and functions in the same manner as the latter.

At the other end the packing sleeve 48 is formed with an enlarged portion 56 the end wall of which is provided with a circular groove 57. It is notable that the inner wall of the groove 57 is defined by a flange 58 that extends beyond the end of the outer wall of the groove 57.

In this form of the invention the shoulder 34 of the enlarged portion 32 is formed with a projecting flange 59 that cooperates with the shaft 31 to define a groove 60. The flange 58 of the end portion 56 of the sleeve 48 is received within the groove 60, while the flange 59 that projects from the shoulder 34 is received within the groove 57.

Referring now more particularly to Figures 4 and 5, still another modification of the invention is shown. In this view the packing sleeve as an entirety is made up of a plurality of wide rings 61 and narrow rings 62. Both the rings 61 and 62 have the same inner diametrical dimension to snugly fit about the shaft 31, and when assembled they define a corrugated structure comparable to the corrugated sleeve 48. When this form of the invention is availed of it is necessary to employ a slightly different type of packing gland, such gland being shown at 63 in Figure 4.

The gland 63 is of a cup-like formation defining a recess 64 that receives one of the wide rings 61. The cup shaped recess 64 is defined by a flange 65, the end wall of which has in engagement therewith a flange 66 formed on a sleeve 67. This sleeve 67 is fitted about one of the wider rings 61, and extends over one of the narrow rings 62 as illustrated, and engaging with the flange 66 is the coil spring 47.

The outer face of the packing gland 63 is formed with a ring-like flange 68 the inner cylindrical wall of which is slightly spaced from the shaft 31, as illustrated, and this flange 68 is formed with a ground surface 69 that corresponds to the ground surface 40 of the packing gland 41.

While preferred specific embodiments of the invention are hereinbefore set forth it is to be clearly understood that we are not to be limited to the exact constructions illustrated and described, because various modifications of these details may be provided in putting the invention into practice within the purview of the appended claims.

We claim:

1. The combination with a housing, spaced bearing elements within the housing, and a shaft rotatably mounted in said bearing elements, said shaft having an enlarged portion defined by spaced shoulders and which enlarged portion is received within one of the bearing elements, of sealing means comprising a ring in fixed engagement with one end of one of the bearing elements and having a ground fit with one shoulder of the enlarged portion of the shaft, a second ring having a ground surface and carried by the other bearing element, a packing gland having a ground surface engaging the ground surface on said last mentioned ring, and means interposed between a shoulder of the enlarged portion of the shaft and said packing gland for exerting a relatively expansive force whereby the first mentioned shoulder of the enlarged portion of the shaft is urged against the first mentioned ring to provide a fluid-tight seal, and the ground surface of the packing gland is urged against the ground surface of said second mentioned ring to provide a fluid-tight seal.

2. The combination with a housing, spaced bearing elements within the housing, and a shaft rotatably mounted in said bearing elements, said shaft having an enlarged portion defined by spaced shoulders and which enlarged portion is received within one of the bearing elements, of sealing means comprising a ring in fixed engagement with one end of one of the bearing elements and having a ground fit with one shoulder of the enlarged portion of the shaft, a second ring having a ground surface and carried by the other bearing element, a packing gland having a ground surface engaging the ground surface on said last mentioned ring, a ring carried by the shaft and in engagement with a shoulder of the enlarged portion, and an elastic packing means disposed about said shaft and interposed between said ring and packing gland.

3. The combination with a housing, spaced bearing elements within the housing, and a shaft rotatably mounted in said bearing elements, said shaft having an enlarged portion defined by spaced shoulders and which enlarged portion is received within one of the bearing elements, of sealing means comprising a ring in fixed engagement with one end of one of the bearing elements and having a ground fit with one shoulder of the enlarged portion of the shaft, a second ring having a ground surface and carried by the other bearing element, a packing gland having a ground surface engaging the ground surface on said last mentioned ring, a ring carried by the shaft and in engagement with a shoulder of the enlarged portion of the shaft, a rubber composition packing interposed between said last mentioned ring and said packing gland.

4. The combination with a housing, spaced bearing elements within the housing, and a shaft rotatably mounted in said bearing elements, said shaft having an enlarged portion defined by spaced shoulders and which enlarged portion is received within one of the bearing elements, of sealing means comprising a ring in fixed engagement with one end of one of the bearing elements and having a ground fit with one shoulder of the enlarged portion of the shaft, a second ring having a ground surface and carried by the other bearing element, a packing gland having a ground surface engaging the ground surface on said last mentioned ring, a ring carried by the shaft and in engagement with a shoulder of the enlarged portion of the shaft, and a coil spring interposed between said last mentioned ring and the packing gland.

5. The combination with a housing, spaced bearing elements within the housing, and a shaft rotatably mounted in said bearing elements, said shaft having an enlarged portion defined by spaced shoulders and which enlarged portion is received within one of the bearing elements, of sealing means comprising a ring in fixed engagement with one end of one of the bearing elements and having a ground fit with one shoulder of the enlarged portion of the shaft, a second ring having a ground surface and carried by the other bearing element, a packing gland having a ground surface engaging the ground surface on said last mentioned ring, a ring in engagement with the shoulder of the enlarged portion of the shaft, a packing sleeve of a rubber composition disposed about said shaft and in engagement at one end with said last mentioned ring, said sleeve being formed with a recess at its other end, said packing gland having a flange extending into said recess, and a coil spring disposed about said sleeve and engaging the said last mentioned ring at one end and the packing gland at the other.

6. The combination with a housing, spaced bearing elements within the housing, and a shaft formed with an enlargement and rotatably mounted in said bearing elements, of sealing means comprising a ring engaging one end of the enlargement with a ground fit, a second ring engaging a ground surface carried by one of the bearing elements, and expansive means for urging said parts into engagement with each other comprising alternately disposed wide and narrow rings having bores of the same diametrical dimensions which snugly receive the said shaft.

7. The combination with a housing, spaced bearing elements within the housing, and a shaft formed with an enlargement and rotatably mounted in said bearing elements, of sealing means comprising a ring engaging one end of the enlargement with a ground fit, a second ring engaging a ground surface carried by one of the bearing elements, and expansive means for urging said parts into engagement with each other comprising alternately disposed wide and narrow rings formed from a resilient elastic material, one of said rings engaging the enlargement on said shaft at one end, while another ring engages the said second ring at the other end.

8. The combination with a housing, spaced bearing elements within the housing, a shaft formed with an enlargement and rotatably mounted in said bearing elements, of sealing means comprising a ring engaging one end of the enlargement with a ground fit, a second ring engaging a ground surface carried by one of the bearing elements, and expansive means for urging said parts into engagement with each other comprising alternately disposed wide and narrow rings having bores which snugly receive said shaft, and a coil spring disposed about said rings and engaging the enlargement on the shaft at one end and the said second ring at the other end.

9. The combination with a housing, spaced bearing elements within the housing, and a shaft formed with an enlargement and rotatably mounted in said bearing elements, of sealing means comprising a ring engaging one end of the enlargement with a ground fit, a second ring engaging one of the bearing elements with a ground fit, expansive means snugly and sealingly engaging and enclosing the said shaft adjacent to one of said ground fits for urging said several parts into engagement with each other to maintain the seals provided by the ground fits and also for preventing the escape of fluid along the shaft past the ground fit to which said expansive means is adjacent, and supplemental expansive means encircling said first mentioned expansion means and engaging said rings.

10. The combination with a housing, spaced bearing elements within the housing, and a shaft formed with an enlargement and rotatably mounted in said bearing elements, of sealing means comprising a ring engaging one end of the enlargement with a ground fit, a second ring engaging one of the bearing elements with a ground fit, and expansive means snugly and sealingly engaging and enclosing the said shaft adjacent to one of said ground fits to prevent the scape of fluids along said shaft past said ground fit for urging said several parts into engagement with each other to maintain the seals provided by the ground fits.

WALTER V. CZARNECKI, JR.
WESLEY CZARNECKI.